July 23, 1968   W. DANKELMEIER ET AL   3,393,811
PROCESS AND APPARATUS FOR DIVIDING HARDENED PILES OF STONE
Filed Feb. 16, 1965   5 Sheets-Sheet 4
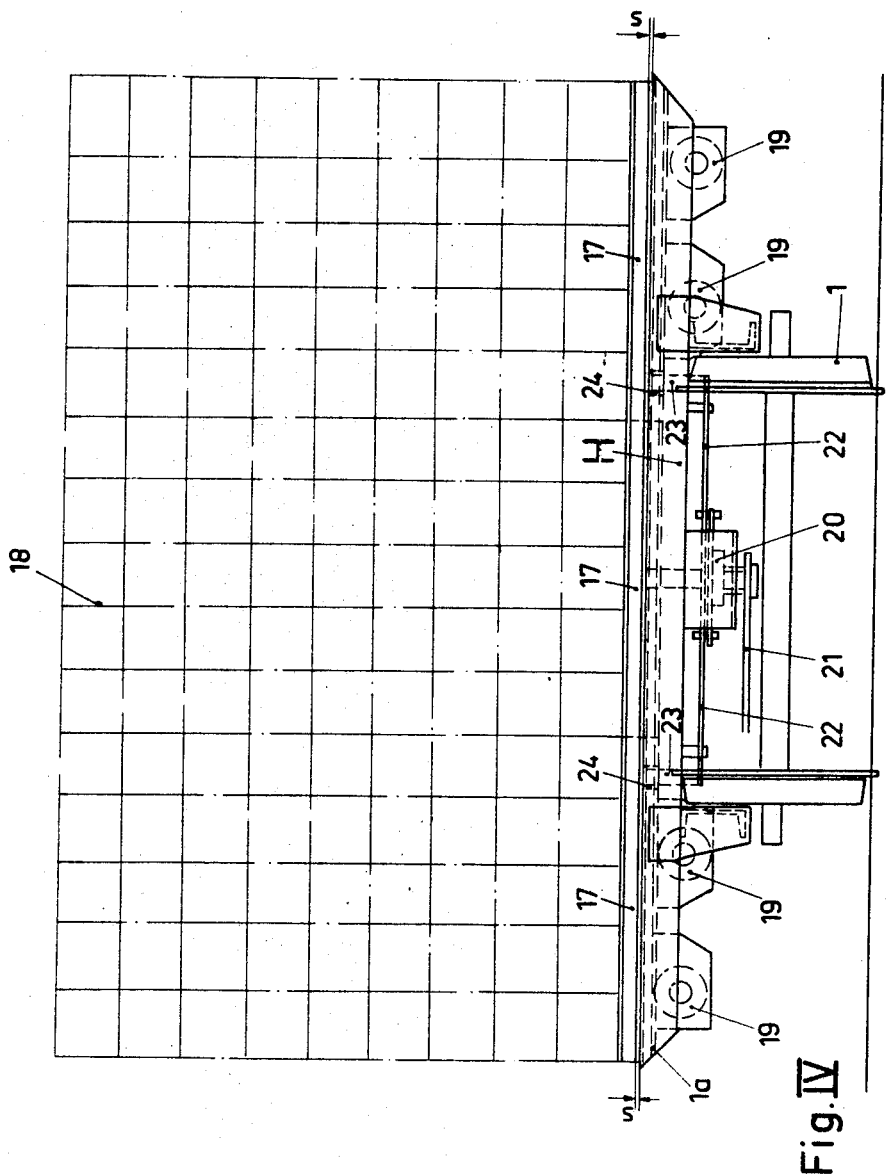
Fig. IV
INVENTORS

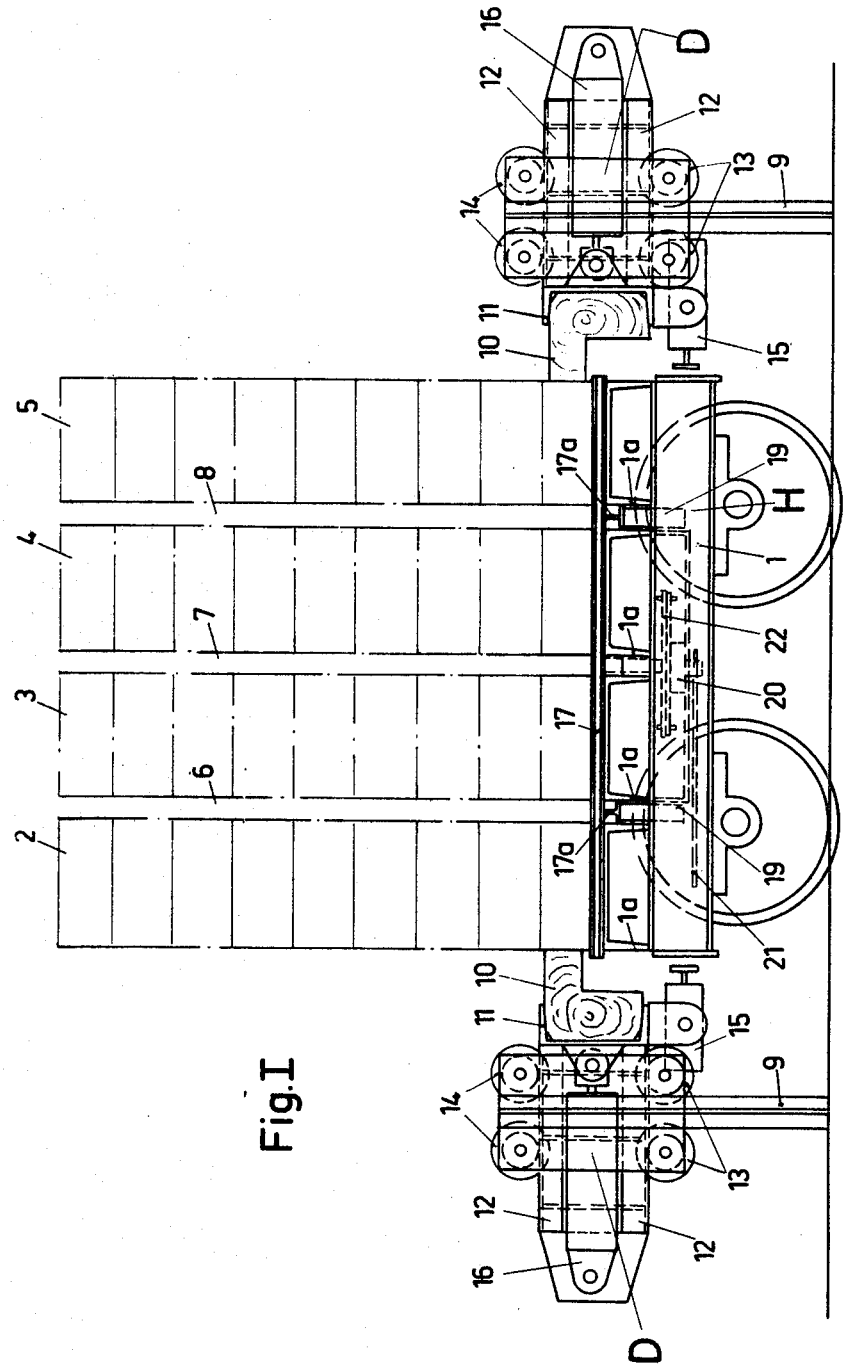

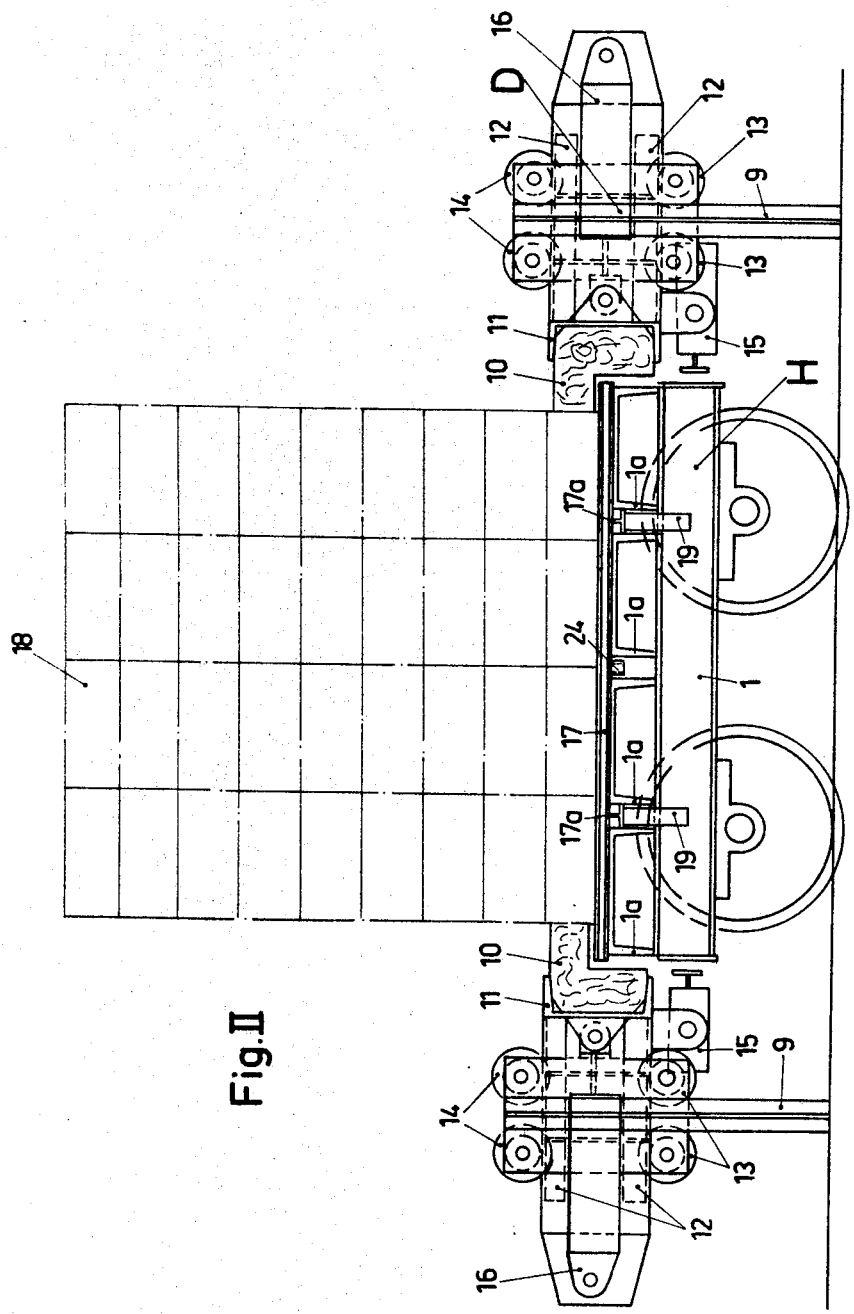

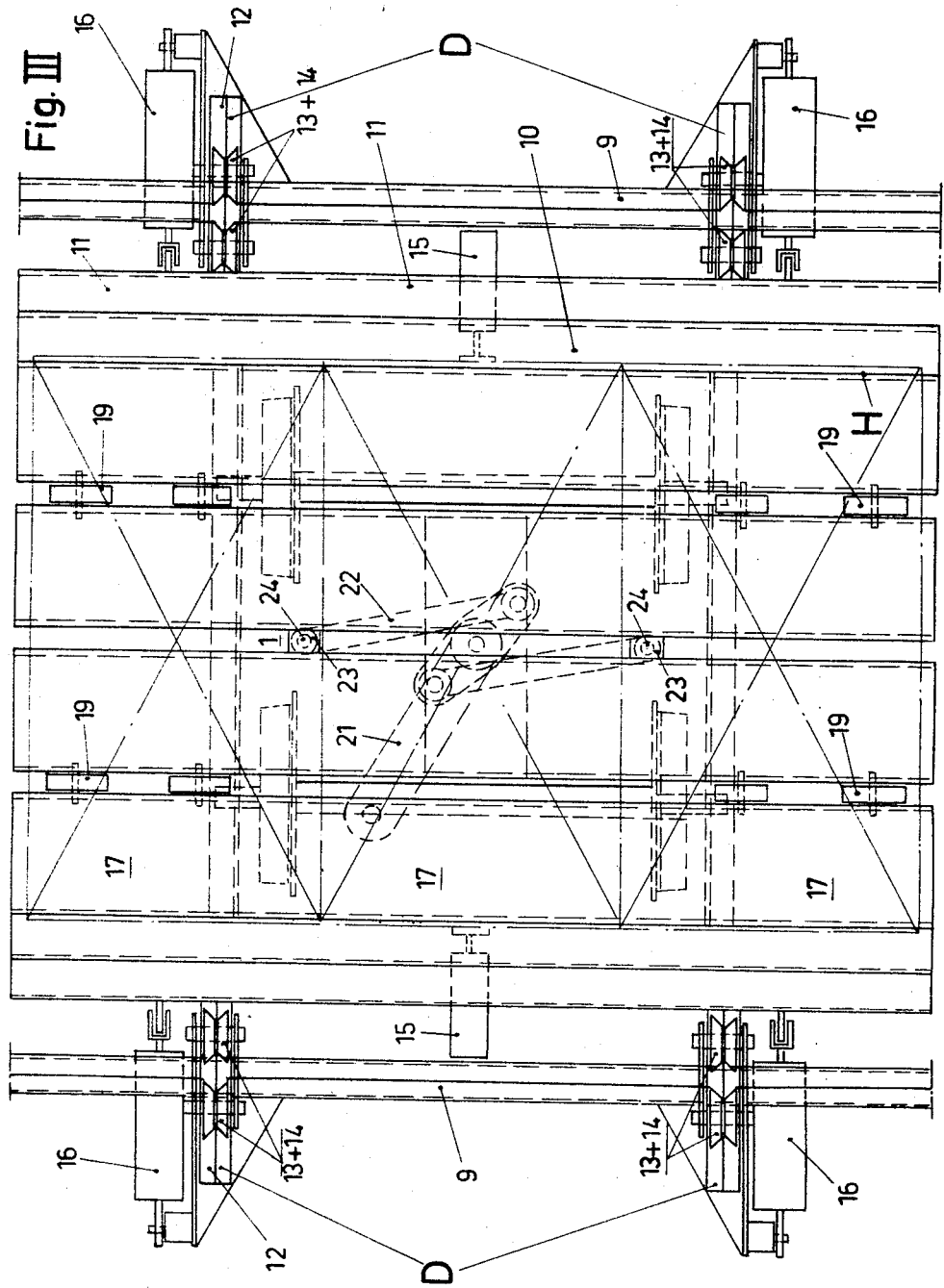

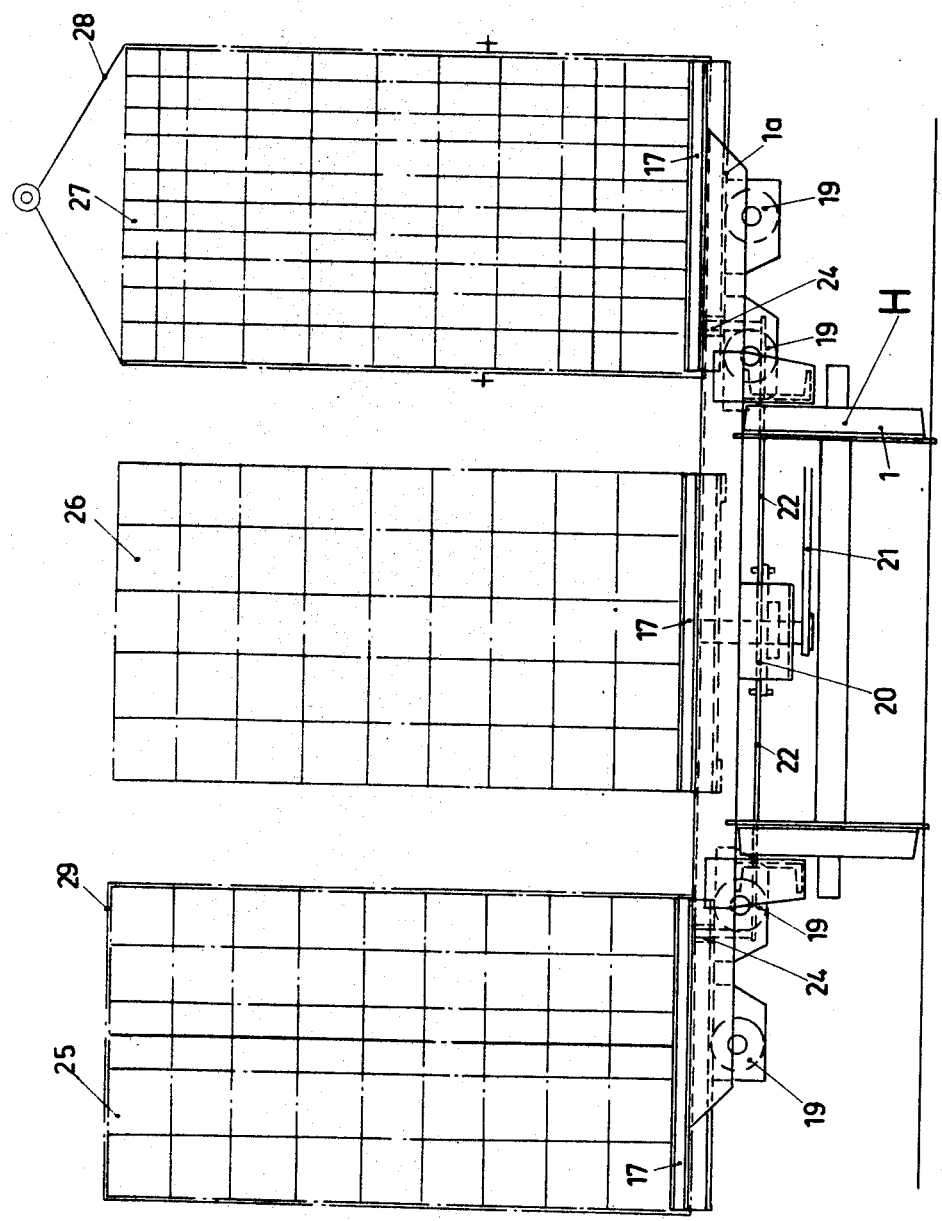

United States Patent Office 3,393,811
Patented July 23, 1968

3,393,811
PROCESS AND APPARATUS FOR DIVIDING HARDENED PILES OF STONE
Wilhelm Dankelmeier, Hausbergerstr. 29, Neesen uber Minden, Germany, and Wolfgang Schumacher, Untere Bockgasse 6, Wurzburg, Germany
Filed Feb. 16, 1965, Ser. No. 432,957
Claims priority, application Germany, Feb. 19, 1964, P 33,625
5 Claims. (Cl. 214—6)

ABSTRACT OF THE DISCLOSURE

Stacks of hardened blocks of stones, coming from hardening apparatus, are separated into smaller stacks for ready distribution by delivering separate single stacks onto a plurality of pallets and pressing the separate stacks together into a single compact vertical stack of predetermined dimensions, whereafter the pallets are separated from each other in the horizontal direction so that each pallet carries a single stack of stones.

---

In the production of hardened or baked hydraulic stones like chalky sandstones, clinkers or the like the way from the hardening furnace to the building yard partly causes considerable wastage of material today.

In the conventional processes the stacks of stone leaving the furnace are seized by stone nippers, thereby squeezed, and loaded on trucks from which they are tilted off in the building yard. The stones are then singly piled up on pallets of about 600 x 1100 mm. as commonly used in building. Sometimes they are also piled up already on pallets by hand at the manufacturer's by using clamping devices according to known processes.

The repeated seizing of the stones by hand, especially the piling up in the building yard, is not only uneconomical but above all brings about an extraordinary high rate of wastage which is further increased in transportation by lifting cars or other usual loading—or unloading cars, let alone the prohibition of the simple tilting off in concentration areas suffering from lack of room.

These disadvantages are eliminated by the invention, which provides a simple process and apparatus with the help of which the rate of wastage of stones on the way through or from the manufacturer's works until they are used in the building yard is reduced to a minimum by directly loading and separately unloading them from the hardening carriages provided with palletized piles, i.e. without handling, and the stones thus palletized mechanically are set off in the building yard in piles of the above prescribed basic measurement by using common steel cages or belt wrappings.

Besides the reduction of losses of breakage the advantages include saving in workers' time and especially rational storing.

According to the present invention there is provided a process for separating stacks of stones, bricks, or like blocks into a plurality of stacks of required dimensions comprising the steps of delivering separate single stacks of stones onto a plurality of closely adjacent pallets, locating the stones with a pressing device which squeezes the stacks into a single compact vertical stack of predetermined dimensions, and moving the pallets relative to each other in a horizontal direction so that each pallet carries a single stack of stones of the required dimensions.

According to the present invention there is provided an apparatus for separating stacks of stones, bricks or like blocks into a plurality of stacks of required dimensions, comprising a plurality of pallets carried by a movable carriage assembly, the pallets being movable alternately into a closely adjacent or spaced apart relationship, a separating device adapted to move the pallets into either of their said relationships, and a pressing device capable of squeezing separate stacks of stones delivered onto the pallets which are closely adjacent one another into a single compact vertical stack of predetermined dimensions, whereby when the stacks of stones delivered onto the pallets have been squeezed into the single compact stack the separating device may be operated to move the pallets relatively away from each other so that each pallet carries a single stack of stones of the required dimensions.

An advantageous embodiment of the apparatus according to the invention consists in that the pallets are disposed on longitudinal cappings above the frame of the hardening carriage; the middle pallet rests firmly, and the outer pallets are removably connected from each other out of their position by means of a disconnecting device actuated by lever rods on the hardening carriage.

A further advantageous embodiment of the apparatus according to the invention consists in that the disconnecting device comprises rods actuated by an eccentric sheave for the lateral pallets, the disconnecting device being disposed on a pivot about centrically in the middle of the frame of the carriage beneath the middle unmovable pallet, and the ends of the rods are hinged on the lateral pallets, and guide rollers are provided beneath these pallets on which the pallet feet glide.

Yet a further advantageous embodiment of the apparatus according to the invention consists in that the rods are coupled with the ends of the sheave provided with an actuating lever. The rods for their part, carry on their ends tube pieces engaging boxes centrically and firmly mounted beneath the lateral pallets, and the pallet feet engaging the spaces of the longitudinal cappings above the frame and guide rollers are deposited in the spaces between them.

Finally an advantageous embodimemnt of the apparatus according to the invention also consists in that the pressing machine has two equal parts disposed in front and behind the carriage; each part comprises a longitudinal frame as well as pressure cylinders for the pressure wood and its support mounted on the frame in guide rollers and its holders and each part has a centrically disposed adjusting cylinder in the height of the frame of the hardening carriage, and the guide rollers for the pressure cylinders are disposed across the frame on both its outer ends, and the pressure woods are about in the height of the foot of the stone pile.

The invention is explained in the attached drawings and illustrations of an example as well as in the following description.

FIGURE I shows a view of the pressing machine according to the invention, including a hardening carriage with pallets put on it and a pile of stone still separated, FIGURE II shows a view of the pressing machine according to FIGURE I with a pile of stone already squeezed together, FIGURE III shows an elevational view of the pressing machine and the hardening carriage with the open pile of stone according to FIGURE I before the pressing together of the stacks of stone, FIGURE IV shows an end view of the hardening carriage according to the invention with the lateral separating device in a position not yet activated, FIGURE V shows an end view of the hardening carriage according to FIGURE IV after the separating device has been activated.

FIGURE I represents a movable hardening carriage assembly H with a frame 1 and longitudinal support members 1a disposed on the frame. Three or more pallets 17 are carried on these longitudinal support members 1a. Each of these pallets has on its lower side two continuing feet 17a engaging the spaces of the longitudinal support members 1a.

The divided stacks 2, 3, 4 and 5 are placed upon the pallets of the hardening carriage H with the help of the common automation of the stone presses, the hardening carriage is then passed through the hardening furnace and enters the area of the pressing machine D.

The pressing machine D comprises two equal or similar parts which engage or seize the stacks of stones from either side and squeeze them into a single stack. The parts can be turnably disposed along the rail axis or also in an angle hereto or also perpendicularly. Both parts can also be moved. Moreover one part can be e.g. stationary and the other one turnable or moved.

The pressing machine in particular consists of a longitudinal frame 9, the pressure member 10 with its support 11, guide rails or tracks 12 for the guide rollers 13 and 14 as well as two piston and cylinder assemblies 16, 16. Each part moreover has a corresponding adjusting cylinder 15 capable of engaging the movable carriage assembly.

When the hardening carriage with the stacks of stones (2, 3, 4 and 5) is moved into the zone of the pressing machine D the frame 1 of the carriage is disposed at the same height as the adjusting cylinder 15, and, on the other hand, the foot of the stone stack is at the same height as that of pressure members 10. The hardening carriage with its stack is now adjusted and kept in its position by means of the adjusting cylinder 15 and frame 1, whereas the piston and cylinder assemblies 16, 16 squeeze the single stacks 2, 3, 4 in such way that they form a single compact stack 18, see FIGURE II. This stack can be naturally also adjusted from all sides before it is squeezed.

The pressing machine D is then moved away from the hardening carriage H.

The pressing machine according to FIGURES I–III can be driven mechanically, electrically, pneumatically, hydraulically or otherwise.

FIGURE III shows besides the pressing machine D an elevational view of the hardening carriage, i.e. with its eccentric sheave 20 of the separating device which is firmly disposed on a pivot in the center of the carriage. The eccentric sheave 20 has two ends each of which is connected to a rod 22, on the remote ends of which there are disposed perpendicular tube pieces 23 rigidly engaging boxes 24 disposed across and centrically about beneath the lateral or outer pallets 17. There is moreover disposed an actuating lever 21 on the eccentric sheave 20.

The outer pallets 17 with their continuing feet 17a each stand on four guide rollers 19 which are mounted on the frame of the carriage.

According to FIGURE IV these feet 17a of pallets 17 and the guide rollers 19 are disposed in such a way that the outer pallets glide on the longitudinal support members 1a with a slight clearance s, see also FIGURE V.

When the lever 21 is actuated and thus the eccentric sheave 20 is moved off its inclined position and thereby the two outer pallets 17 are moved apart by means of rods 22, tubes 23 which urge the boxes 24 of outer pallets 17 over the guide rollers 19 into a lateral position on the carriage, as shown in FIGURE V.

FIGURE V represents the stack 18 divided into the separate stacks 25, 26 and 27, each carried by a pallet 17, by means of the separating device according to the invention, which latter can be driven mechanically, electrically, pneumatically, hydraulically or otherwise.

The single stacks 25, 26, 27 are then ready for transportation and may be provided in the usual way with tightening straps 29 or with a transport basket 28 which can have a suspension for a tower crane on its upper part.

What we claim is:

1. A process for separating stacks of stones, bricks, or like blocks into a plurality of stacks of required dimensions comprising the steps of delivering separate single stack of stones with transverse spaces between the stacks onto a plurality of closely adjacent pallets, locating the stones with a pressing device which squeezes longitudinally the plurality of stacks into a single compact vertical stack of pre-determined dimensions, and moving the pallets laterally and away from each other in a horizontal direction so that each pallet carries a single stack of stones of the required dimensions.

2. An apparatus for separating stacks of stones, bricks or like blocks into a plurality of stacks of required dimensions, comprising a movable carriage assembly;

a plurality of pallets carried by said carriage assembly;
the pallets being movable alternately into a closely adjacent or spaced-apart relationship and laterally and away from each other;
a separating device adapted to move the pallets into one of the said relationships;
and a pressing device adapted to squeeze separate stacks of stones delivered with transverse spaces between the stacks onto the pallets which are closely adjacent one another into a single compact vertical stack of pre-determined dimensions, said pressing device comprising two similar parts which, in operation, are located on opposite sides of said movable carriage, each part being located on a guide rail and comprising a pressure member carried by a holding element engageable with the stacks of stones delivered onto the pallets;
whereby when the stacks of stones delivered onto the pallets have been squeezed into a single compact stack the separating device may move the pallets relatively away from each other so that each pallet carries a single stack of stones of the required dimensions.

3. An apparatus as defined in claim 2, in which there are provided three pallets lying in a horizontal plane, the middle pallet being fixed to the carriage assembly and the outer pallets being movable with respect to the carriage assembly towards and away from the fixed pallet.

4. Apparatus as defined in claim 2, in which guide tracks are joined to the holding element,
said guide tracks being guided by guide rollers;
said apparatus further including a plurality of piston and cylinder assemblies adapted to drive said pressure member; and
an adjusting piston and cylinder assembly adapted to operably engage said movable carriage.

5. An apparatus as defined in claim 3, in which said separating device comprises a crank member pivotably mounted on said movable carriage about the center of the middle pallet,
the crank member having two ends each of which is connected with a rod;
a perpendicular tube piece pivotably connected to the end of each rod remote from the crank member,
each perpendicular tube piece extending into a box rigidly connected to an outer pallet,
the outer pallets being mounted on rollers carried in the frame of said carriage, there being further provided an actuating lever connected with the crank member which lever may be operated to cause the outer pallets to move towards or away from the middle pallet.

References Cited

UNITED STATES PATENTS

| | | | |
|---|---|---|---|
| 1,055,490 | 3/1913 | Penfield | 214—6 |
| 1,121,658 | 12/1914 | Penfield | 214—6 |
| 2,128,316 | 8/1938 | Paul | 214—6 |
| 2,769,570 | 11/1956 | Adams. | |
| 3,111,233 | 11/1963 | Raynor | 214—6 |

ALBERT J. MAKAY, *Primary Examiner.*